United States Patent
Dang et al.

(10) Patent No.: US 6,996,669 B1
(45) Date of Patent: *Feb. 7, 2006

(54) CLUSTER-BASED CACHE MEMORY ALLOCATION

(75) Inventors: Quoc N. Dang, Brea, CA (US); Tsun Y. Ng, Orange, CA (US); Ralph H. Castro, Lake Forest, CA (US); Virgil V. Wilkins, Perris, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/628,144

(22) Filed: Jul. 28, 2003

Related U.S. Application Data

(63) Continuation of application No. 09/552,407, filed on Apr. 19, 2000, now Pat. No. 6,606,682.

(51) Int. Cl.
*G06F 12/00* (2006.01)

(52) U.S. Cl. .................. 711/113; 711/118; 711/202
(58) Field of Classification Search .............. 711/113, 711/118, 202, 170, 154, 206, 133; 365/49, 365/50; 707/200
See application file for complete search history.

(56) References Cited

U.S. PATENT DOCUMENTS 5,561,786 A * 10/1996 Morse .................. 711/170
5,875,352 A * 2/1999 Gentry et al. .......... 710/23
6,018,789 A * 1/2000 Sokolov et al. ......... 711/113
6,606,682 B1 * 8/2003 Dang et al. ............ 711/113

* cited by examiner

*Primary Examiner*—Donald Sparks
*Assistant Examiner*—Brian R. Peugh
(74) *Attorney, Agent, or Firm*—Milad G. Shara, Esq.; Robroy R. Fawcett, Esq.

(57) ABSTRACT

The present invention relates to a disk drive including a cache memory having a plurality of sequentially-ordered memory clusters for caching disk data stored in sectors (not shown) on disks of a disk assembly. The disk sectors are identified by logical block addresses (LBAs). A cache control system of the disk drive comprises a cluster control block memory, having a plurality of cluster control blocks (CCB), and a tag memory 22, having a plurality of tag records, that are embedded within the cache control system. Each CCB includes a cluster segment record with an entry for associating the CCB with a particular memory cluster and for forming variable length segments of the memory clusters without regard to the sequential order of the memory clusters. Each tag record assigns a segment to a continuous range of LBAs and defines the CCBs forming the segment. Each segment of the memory clusters is for caching data from a contiguous range of the logical block addresses. The cache control system efficiently exploits available memory clusters for responding to host commands.

14 Claims, 4 Drawing Sheets

FIG. 6
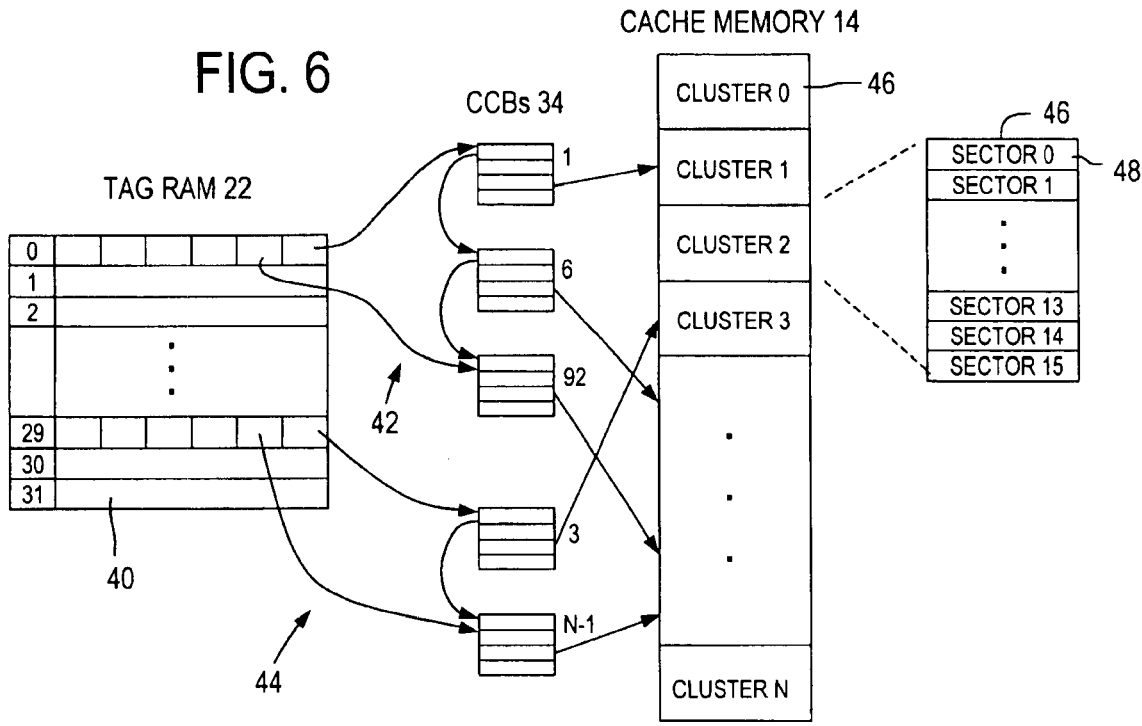
FIG. 7
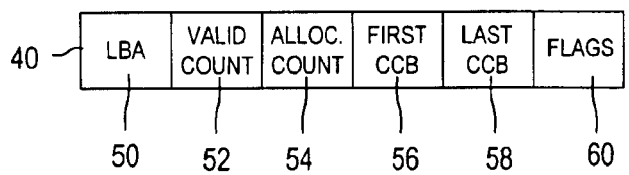
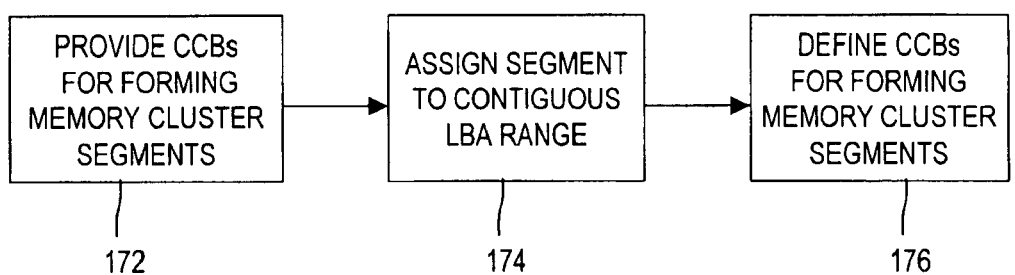
FIG. 8

CLUSTER-BASED CACHE MEMORY ALLOCATION

This application is a continuation of application No. 09/552,407, filed Apr. 19, 2000, now Pat. No. 6,606,682, herein incorporated by reference.

BACKGROUND OF THE INVENTION

1. Field of the Invention

The present invention relates to disk drive performance features, and more particularly to a disk drive having a cache control system for improving the disk drive's response time to host commands.

2. Description of the Prior Art

A host computer stores and accesses data on a disk drive by issuing commands to the disk drive over a standardized interface. The smallest indivisible data unit addressable on a disk is a logical block or disk sector, typically of 512 bytes, and each such disk sector is assigned a logical block address (LBA). When the host computer sends a command to the disk drive, the nature of the command is specified, e.g., read or write, along with a start LBA and a count specifying the number of contiguous sectors to be transferred.

Existing disk drives typically have a semiconductor cache memory for temporarily storing disk data that is likely to be requested by a host computer. The response time latency for storing and accessing data in a semiconductor memory is much smaller than the response time latency for mechanically storing and accessing data stored on a rotating disk. In existing disk drives, disk data is generally cached in contiguous fixed length memory segments. The memory segments may be inefficiently configured to order to accommodate host commands having a long LBA range thereby wasting valuable data storage space in the cache memory if such commands occur infrequently.

Accordingly, there exists a need for a disk drive having a disk cache system for efficiently allocating and configuring memory segments for responding to host commands. The present invention satisfies these needs.

SUMMARY OF THE INVENTION

The invention may be embodied in a disk drive, and related method, for servicing host disk commands using a cache memory having a plurality of sequentially-ordered memory clusters for caching disk data of disk sectors identified by logical block addresses. The disk drive includes a cache control system having a plurality of cluster control blocks and a tag memory usable only for providing a plurality of tag records. Each cluster control block has a cluster segment record for associating the cluster control block with a particular memory cluster and for forming variable length segments of the memory clusters without regard to the sequential order of the memory clusters. Each tag record assigns a segment to a contiguous range of logical block addresses and defines the cluster control blocks forming the segment. Each segment of the memory clusters is for caching disk data of the assigned contiguous range of logical block addresses.

In more detailed features of the invention, the cluster segment record of each cluster control block associated with a segment may include a pointer to a subsequent cluster control block or to indicate an end cluster control block of the segment. Each tag record may define a length for the assigned segment by pointing to a first cluster control block and by pointing to a last cluster control block for the segment or by indicating a count of cluster control blocks for the segment. Also, the memory clusters may be uniformly sized.

In other more detailed features of the invention, the disk drive may further include a free list for identifying cluster control blocks not associated with a tag memory record and forming a segment of the identified cluster control blocks. Each tag record for an assigned segment may point to a first cluster control block, a last cluster control block, and indicate a count of sectors for the segment. A length of an original assigned segment may be increased by removing a segment of cluster control blocks from the free list segment, changing the original segment's last cluster control block to point to a first cluster control block of the removed segment, and changing the tag record to point to the last cluster control block of the removed segment. The disk drive also may include a microprocessor that de-allocates an existing assigned segment and assigns the segment's associated cluster control blocks to the free list if a sufficient number of cluster control blocks are not available on the free list to enable caching of a range of logical block addresses requested by a host command.

BRIEF DESCRIPTION OF THE DRAWINGS

The accompanying drawings illustrate embodiments of the present invention and, together with the description, serve to explain the principles of the invention.

FIG. 6 is a block diagram showing a table of tag records in a tag memory of the cache control system of FIG. 1, for defining the CCBs forming a segment of memory clusters.

FIG. 7 is a data structure for a tag record in the table of tag records of FIG. 5, for forming memory segments using the CCBs.

FIG. 8 is a flow chart showing a method for allocating CCBs to form variable length memory segments without regard to the sequential order of the memory clusters in the segments.

DETAILED DESCRIPTION

Figure 1:
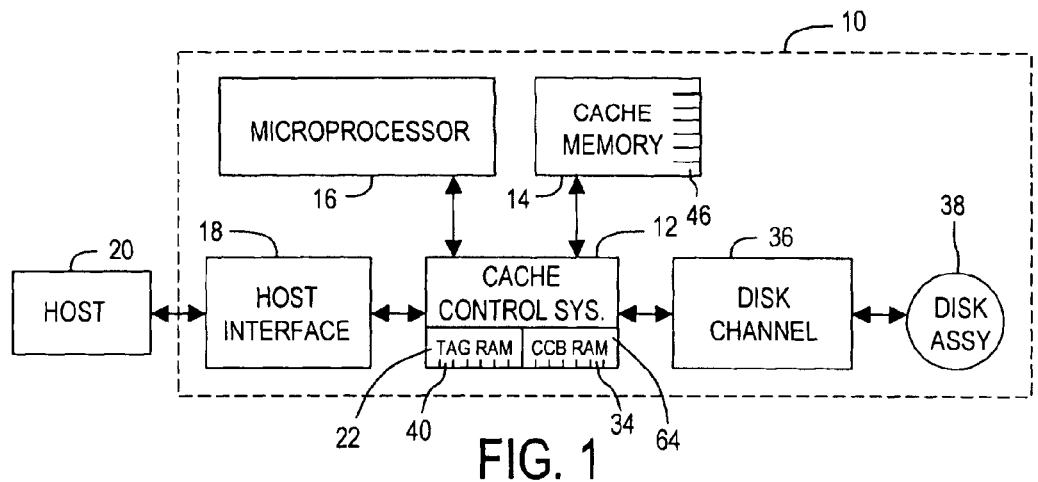
FIG. 1 is a block diagram of a disk drive having a cache control system with cluster control blocks (CCBs) for forming variable-length memory segments using memory clusters without regard to the sequential order of the memory clusters, according to the present invention.
Figure 4:
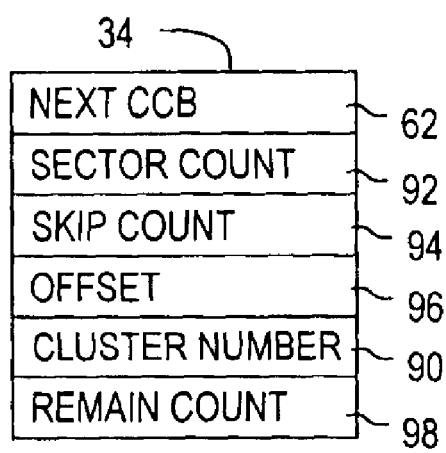
FIG. 4 is a data structure for a CCB for forming memory segments.

With reference to FIG. 1, a disk drive 10 comprises a cache memory 14 having a plurality of sequentially-ordered memory clusters 46 for caching disk data stored in sectors (not shown) on disks of a disk assembly 38. Conventionally the disk sectors are identified by logical block addresses (LBAs). A cache control system 12 of the disk drive 10 comprises a cluster control block memory, having plurality of cluster control blocks (CCBs) 34, and a tag memory 22, having a plurality of tag records 40, that are embedded within the cache control system 12. Each CCB 34 includes a cluster segment record with an entry 90 (FIG. 4) for associating the CCB 34 with a particular memory cluster 46 and for forming variable length segments of the memory clusters 46 without regard to the sequential order of the memory clusters 46. Each tag record 40 assigns a segment to a continuous range of LBAs and defines the CCBs 34 forming the segment. Each segment of the memory clusters 46 is for caching data from a contiguous range of the logical block addresses. The cache control system 12 efficiently exploits available memory clusters 46 for responding to host commands.

The disclosures of the following three U.S. Patent Applications are hereby incorporated by reference: application Ser. No. 09/552,404, filed Apr, 19, 2000, now U.S. Pat. No. 6,553,457, titled TAG MEMORY DISK CACHE ARCHITECTURE; application Ser. No. 09/552,399, filed Apr. 19, 2000, now U.S. Pat. No. 6,601,137, titled RANGE-BASED CACHE CONTROL SYSTEM AND METHOD; and application Ser. No. 09/552,402, filed Apr. 19, 2000, titled CACHE CONTROL SYSTEM AND METHOD HAVING HARDWARE-BASED TAG RECORD ALLOCATION.

With reference again to FIG. 1, the disk drive 10 further includes a microprocessor 16, and a host interface 18. The host interface 18 receives host commands from a host 20, such as a personal computer, and transfers disk data between the disk drive 10 and the host 20. The host commands identify the disk data using a start logical block address (LBA) and a count specifying the number of contiguous sectors to be transferred. The cache memory 14 caches the disk data under the direction of the cache control system 12 and the microprocessor 16. The microprocessor 16 operates under firmware control and manages the operation of the disk drive 10 and assists hardware elements under specific conditions. The cache memory 14 is random access memory, typically 2 megabytes (MB). Generally, the larger the cache memory 14, the better the performance of the disk drive 10 in responding to host commands.

The disk drive 10 also includes a disk channel 36 and the aforementioned disk assembly 38. The disk assembly 38 includes a disk platter that is organized into the disk sectors, typically of 512 bytes plus redundancy bytes for error correction, which are individually addressable using a logical block address (LBA). The disk channel 36 performs conventional encoding and decoding of data written to and read from the disk.

Figure 2:
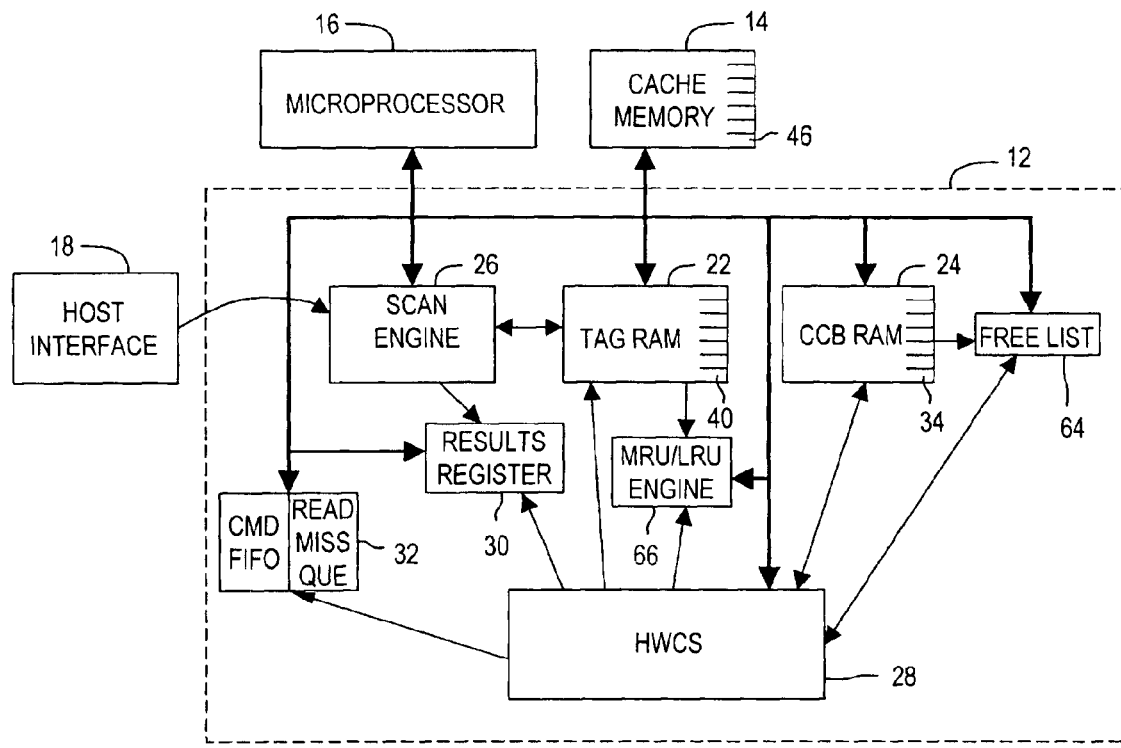
FIG. 2 is a block diagram showing the cache control system of FIG. 1, with a tag memory having tag records and a CCB memory having the CCBs, according to the present invention.

The cache control system 12 is shown in more detail in FIG. 2. The cache control system 12 includes the aforementioned tag (random access) memory (RAM) 22 and the aforementioned CCB memory or RAM 24. The tag memory 22 is a static random access memory (SRAM) structure which is preferably embedded in an integrated controller chip having a table of the aforementioned tag or segment records 40. The CCB memory is also preferably an embedded SRAM. The embedded tag memory 22 and CCB memory 24 thus provides higher performance and lower cost versus firmware based cache control schemes which use a general-purpose external RAM. In particular, since internal hardware engines, as described further below, may access the tag and CCB records independently from microprocessor 16, the cache control system 12 enables higher performance by off-loading microprocessor 16 and providing hardware-based processing as detailed below.

Figure 3:
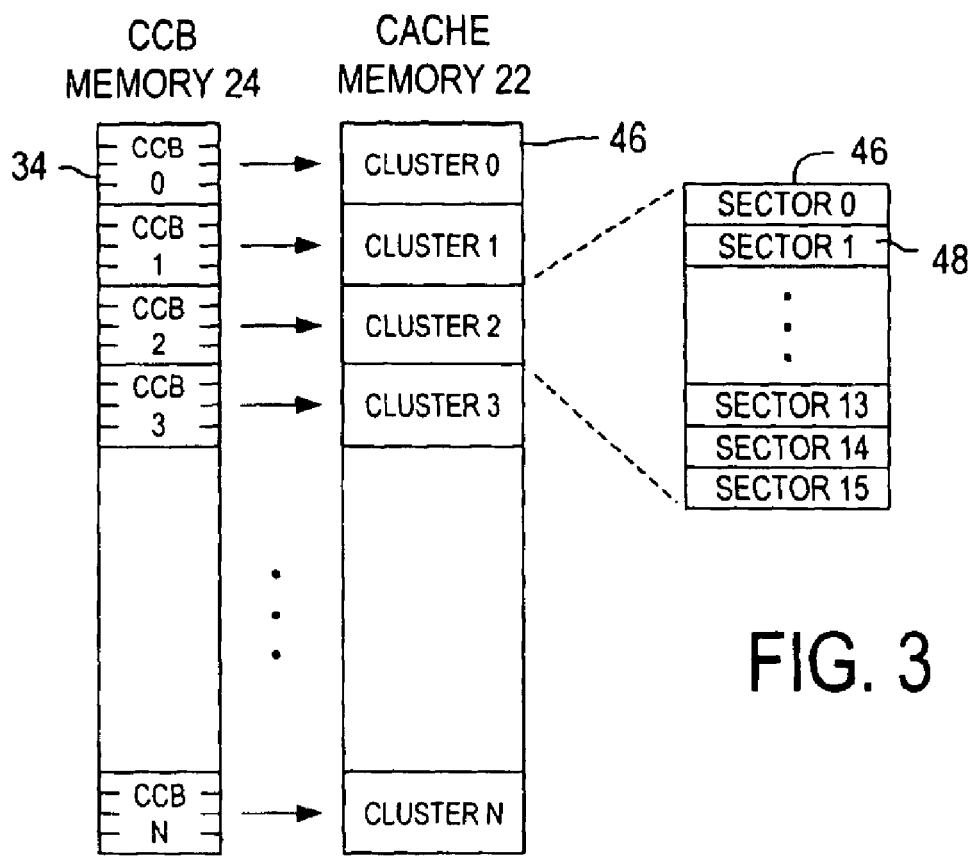
FIG. 3 is a block diagram showing the relationship between the CCBs and the memory clusters.

As shown in FIG. 3, the cache memory 14 is divided into 512 byte blocks or sectors 48. Each cache sector 48 is for storing disk data of a 512 byte disk sector. Note that if the number of bytes in a disk sector is defined to have, for example, 1024 bytes, then the number of bytes in a cache sector is similarly defined to have 1024 bytes. The cache sectors 48 are bunched into the aforementioned consecutively numbered groups or clusters 46. Each cluster 46 has a particular cluster number. Preferably, each cluster 46 has 16 cache sectors 48, although the number of sectors 48 in each cluster 46 may be selected based on the size of the cache memory 14, the size of the CCB SRAM 24, and the operational characteristics of the host 20. The CCB memory 24 is initialized by the microprocessor by forming records or entries for the CCBs 34, shown in FIG. 4. Each CCB record indicates a cluster number 90 and includes a next CCB pointer 62. Other CCB record entries are included for indicating the number of valid sectors 92 and a skip count 94 to the first valid sector 48 in the CCB, and for pointing to a next sector to be piped 96 and a remaining count 98 of sectors 48 to be piped, for data transfer operations.

Figure 5:
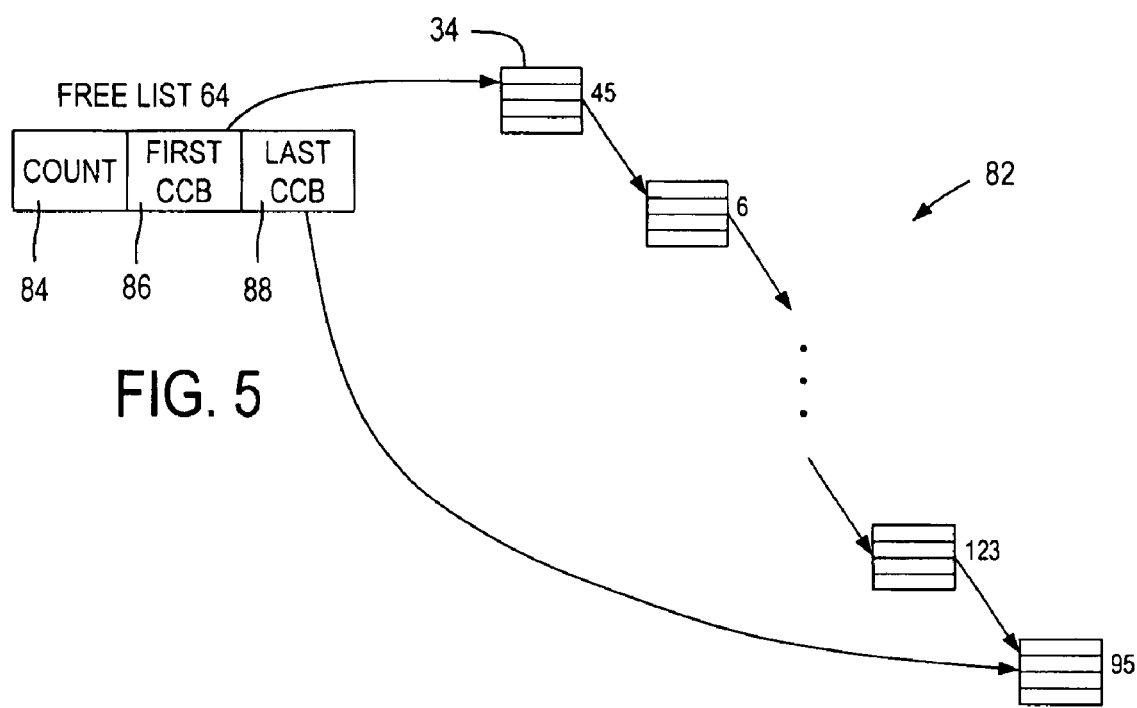
FIG. 5 is a block diagram of a free list for forming a segment of CCBs not assigned to a tag record.

The cache control system 12 also includes a free list 64 shown in FIG. 5. The free list 64 tracks any CCBs 34 not assigned to a tag record 40. The CCB memory 24 is initialized by the microprocessor 16 with all of the CCBs 34 being initially assigned to the free list 64. The free list 64 includes entries for a CCB count 84, a first CCB number 86 and a last CCB member 88. The count entry 84 indicates the number of CCBs 34 on the free list 64 available for assignment to tag records 40. The first CCB entry 86 points to the first CCB 34 on the free list 64. The last CCB entry 88 points to the last CCB 34 on the free list 64. Each CCB 34 points to the next CCB 34 in the free list 64 for forming a free list segment 82. At initialization, the CCBs 34 in the free list segment 82 are configured in consecutive order, but the order of the CCBs in the free list 64 may be scattered after numerous CCB 34 assignments to and returns from to the varying length segments defined by the tag records 40. All CCBs 34 are assigned to either a tag record 40 or to the free list 64.

In the exemplary free list segment 82 shown in FIG. 5, the free list's first CCB 86 entry points to the CCB number 45. The CCB number 45 points to the CCB number 6. The free list segment 82 continues until the last CCB number 95. The CCB number 95 has a null value in its next CCB pointer 62. The free list's last CCB entry 88 points to the CCB number 95. The length of a memory segment formed by the CCB's 34 may be increased by removing CCB's 34 from the free list segment 82, changing the last CCB entry 88 to point to the new last CCB, updating the count entry 84 by subtracting the number of CCBs removed from the free list segment 82, and changing the next segment pointer 62 of the new last CCB to the null value.

The cache control system 12 also includes a scan engine 26 and a host writable control store (HWCS) 28. The scan engine 26 is coupled to the host interface 18 and receives host commands and scans the tag memory 22 for the LBA ranges associated with a host command. The scan engine 26 places the scan results in a results register 30 or, if servicing the host command further requires intervention by the microprocessor 16, the HWCS 28 places the command in a command queue 32. The command queue 32 has a read miss queue and a write command first-in first-out (FIFO) queue. The scan engine 26 is described in more detail in the above-referenced U.S. Pat. No. 6,601,137, titled RANGE-BASED CACHE CONTROL SYSTEM AND METHOD. The CCB memory 24 may be updated by the microprocessor 16 and by the HWCS 28. If a tag record 40 may be allocated for responding to a host command, then the HWCS 28 manages the response to the host command, otherwise the microprocessor 16 may assist with the response. Thus, the HWCS 28 off-loads cache tasks from the microprocessor 16 enabling response to host commands for data without microprocessor intervention.

The tag memory 22 is described in more detail with reference to FIGS. 6 and 7. The tag memory 22 has the plurality of tag records 40 that define segments, 42 and 44, of memory clusters 46 within the cache memory 14. Typically, the tag memory 22 may have 32 or 64 records dedicated to defining variable length segments. Other tag memory records (not shown) may be dedicated to single block transfers for caching small data elements stored within one memory cluster 46 that are repeatedly accessed by the host 20.

The tag memory 22 defines the segments of the cache memory clusters 46 using the CCBs 34. Each tag record 40 has entries or fields (50, 52, 54, 56, 58 and 60), respectively for indicating the first disk LBA assigned to the corresponding segment, the number of valid sectors in the segment, the number of sectors allocated to the segment, the first segment CCB, the last segment CCB, and state and control flags for the segment. A tag record 40 defines a segment by recording the segment's first CCB in the first CCB entry 56. The first CCB 34 has a pointer 62 to the next or second CCB in the segment. The second CCB likewise has a pointer 62 to the next CCB until the last CCB in the segment. The last CCB has an indicator such as a null value that indicates the end of the segment.

Two short exemplary segments, 42 and 44, are shown in FIG. 3. The first segment 42 is defined by the tag record number 1 to have a length of three clusters 46. The second segment 44 is defined by the tag record number 29 to have a length of two clusters 46. The last CCB in each segment, 42 and 44, has a null value in the next CCB pointer 62. The tag memory 22 is described in more detail in the above-referenced U.S. Pat. No. 6,553,457 titled TAG MEMORY DISK CACHE ARCHITECTURE.

The length of a segment defined by a tag record 40 may be extended by changing the last CCB 34 of the segment to point to a next CCB added from the free list 64 and by updating the last segment CCB entry 58 in the tag record 40. The microprocessor 16 may set a threshold count for the CCBs 34 on the free list 64. If the free list count entry 84 falls below the threshold, the microprocessor 16 may de-allocate tag records 40 thus freeing up CCBs 34 to avoid an insufficient CCB error.

The tag record pointer entries, 56 and 58, in conjunction with the CCB pointers 62, allow definition of variable length segments without regard to the logical or numerical order of the clusters 46 in the cache memory 14. Accordingly, the tag memory 22 and the CCB memory 24 provide a flexible and powerful disk cache technique for efficiently responding to host commands.

The cache control system 12 also includes a most-recently-used/least-recently-used (MRU/LRU) engine 66. The MRU/LRU engine 66 keeps track of the usage of the cached data associated with each tag record 40 in the tag memory and is described in detail in the above-reference U.S. application Ser. No. 09/552,402, titled CACHE CONTROL SYSTEM AND METHOD HAVING HARDWARE-BASED TAG RECORD ALLOCATION.

As shown in FIG. 8, the invention also may be embodied in a method for caching disk data of disk sectors identified by logical block addresses using a cache memory 14 having a plurality of sequentially-ordered memory clusters 46. A plurality of cluster control blocks 34 are provided (step 172) for forming memory cluster segments. Each cluster control block 34 has a cluster segment record 90 for associating the cluster control block 34 with a particular memory cluster 46 and for forming variable length segments of the memory clusters 46 without regard to the sequential order of the memory clusters 46. A segment is assigned to a contiguous range of logical block addresses (step 174). The cluster control blocks 34 forming the segment are defined (step 176). Each segment of the memory clusters is for caching disk data of the assigned contiguous range of logical block addresses.

We claim:

1. A disk drive, comprising:
   a cache memory having a plurality of sequentially-ordered memory clusters for caching disk data of disk sectors identified by logical block addresses; and
   a cache control system having
      a plurality of cluster control blocks, each cluster control block having a cluster segment record for associating the cluster control block with a particular memory cluster and for forming variable length segments of the memory clusters without regard to the sequential order of the memory clusters;
      a tag memory having a plurality of tag records, each tag record for assigning a segment to a contiguous range of logical block addresses and for defining the cluster control blocks forming the segment, and each segment of the memory clusters for caching disk data of the assigned contiguous range of logical block addresses.

2. A disk drive as defined in claim 1, wherein the cluster segment record of each cluster control block associated with a segment includes a pointer to a subsequent cluster control block or to indicate an end cluster control block of the segment.

3. A disk drive as defined in claim 1, further comprising a microprocessor that de-allocates an existing assigned segment and assigns the segment's associated cluster control blocks to a free list if a sufficient number of cluster control blocks are not available on the free list to enable caching of a range of logical block addresses requested by a host command.

4. A disk drive as defined in claim 1, wherein the memory clusters are uniformly sized.

5. A disk drive as defined in claim 1, wherein the cache memory is separate from the tag memory of the cache control system.

6. A cache control system for caching disk data of disk sectors identified by logical block addresses using a cache memory having a plurality of sequentially-ordered memory clusters, comprising:
   a plurality of cluster control blocks, each cluster control block having a cluster segment record for associating the cluster control block with a particular memory cluster and for forming variable length segments of the memory clusters without regard to the sequential order of the memory clusters; and
   a tag memory having a plurality of tag records, each tag record for assigning a segment to a contiguous range of logical block addresses and for defining the cluster control blocks forming the segment, and each segment of the memory clusters for caching disk data of the assigned contiguous range of logical block addresses.

7. A cache control system as defined in claim 6, wherein the cluster segment record of each cluster control block associated with a segment includes a pointer to a subsequent cluster control block or to indicate an end cluster control block of the segment.

8. A cache control system as defined in claim 6, further comprising a microprocessor that de-allocates an existing assigned segment and assigns the segment's associated cluster control blocks to a free list if a sufficient number of cluster control blocks are not available on the free list to enable caching of a range of logical block addresses requested by a host command.

9. A cache control system as defined in claim 6, wherein the memory clusters are uniformly sized.

10. A cache control system as defined in claim 6, wherein the tag memory is separate from the cache memory.

11. A method for caching disk data of disk sectors identified by logical block addresses using a cache memory having a plurality of sequentially-ordered memory clusters, and using a plurality of cluster control blocks, each cluster control block having a cluster segment record, the method comprising:

associating a cluster control block with a particular memory cluster using the respective cluster segment record, wherein the cluster segment record is also for forming a variable length segment of memory clusters without regard to the sequential order of the memory clusters;

forming a segment of memory clusters and assigning the segment to a contiguous range of logical block addresses; and caching disk data of the assigned contiguous range of logical block addresses in the memory clusters of the assigned segment.

12. A method for caching disk data as defined in claim 11, wherein the cluster segment record of each cluster control block of a segment includes a pointer to a subsequent cluster control block or to indicate an end cluster control block of the segment.

13. A method for caching disk data as defined in claim 11, further comprising de-allocating an existing assigned segment and assigning the segment's associated cluster control blocks to a free list if a sufficient number of cluster control blocks are not available on the free list to enable caching of a range of logical block addresses requested by a host command.

14. A method for caching disk data as defined in claim 11, wherein the memory clusters are uniformly sized.

* * * * *